(12) United States Patent
Chen et al.

(10) Patent No.: US 11,099,466 B2
(45) Date of Patent: Aug. 24, 2021

(54) PROJECTION MODULE AND ELECTRONICS APPARATUS

(71) Applicant: GOERTEK. INC, Shandong (CN)

(72) Inventors: Peixuan Chen, Shandong (CN); Quanbo Zou, Shandong (CN); Xiangxu Feng, Shandong (CN)

(73) Assignee: GOERTEK, INC, Shandong (CN)

( * ) Notice: Subject to any disclaimer, the term of this patent is extended or adjusted under 35 U.S.C. 154(b) by 174 days.

(21) Appl. No.: 16/475,758

(22) PCT Filed: Jan. 9, 2017

(86) PCT No.: PCT/CN2017/070651
§ 371 (c)(1),
(2) Date: Jul. 3, 2019

(87) PCT Pub. No.: WO2018/126480
PCT Pub. Date: Jul. 12, 2018

(65) Prior Publication Data
US 2021/0141298 A1    May 13, 2021

(51) Int. Cl.
*G03B 21/20* (2006.01)
*H04N 9/31* (2006.01)
*G03B 21/00* (2006.01)

(52) U.S. Cl.
CPC ....... *G03B 21/2033* (2013.01); *G03B 21/008* (2013.01); *G03B 21/2066* (2013.01); *H04N 9/3161* (2013.01)

(58) Field of Classification Search
CPC .............. G03B 21/2033; G03B 21/008; G03B 21/2013; H04N 9/3161; H04N 9/3173; H04N 9/3176
See application file for complete search history.

(56) References Cited

U.S. PATENT DOCUMENTS

| 10,175,564 | B2 * | 1/2019 | Yaras | ...................... H04N 13/32 |
| 2009/0274335 | A1 | 11/2009 | Cheung et al. | |
| 2017/0003748 | A1 * | 1/2017 | Slaby | ................. G06K 9/00335 |

FOREIGN PATENT DOCUMENTS

| CN | 201408315 Y | 2/2010 |
| CN | 101788750 A | 7/2010 |
| CN | 101825832 A | 9/2010 |
| CN | 101963747 A | 2/2011 |
| CN | 102736385 A | 10/2012 |

* cited by examiner

*Primary Examiner* — Ryan D Howard
(74) *Attorney, Agent, or Firm* — Ajay A. Jagtiani; Miles & Stockbridge P.C.

(57) ABSTRACT

A projection module and an electronics apparatus are provided. The projection module comprises: a projection chip, having micro semiconductor light emitting devices thereon; and a projection lens unit, wherein the micro semiconductor light emitting devices produce projection light to create a projection image, and the projection lens unit receives the projection image and projects it to a projection surface.

9 Claims, 3 Drawing Sheets

PROJECTION MODULE AND ELECTRONICS APPARATUS

CROSS-REFERENCE TO RELATED APPLICATIONS

This application is a National Stage of International Application No. PCT/CN2017/070651 filed on Jan. 9, 2017 which is hereby incorporated by reference in its entirety.

FIELD OF THE INVENTION

The present invention relates to the technique field of projection display, and more specifically, to a projection module and an electronics apparatus comprising the same.

BACKGROUND OF THE INVENTION

Digital light processing (DLP) is a display device based on optical micro-electro-mechanical technology that uses a digital micro-mirror device. DLP is used in a variety of display applications from traditional static displays to interactive displays and also non-traditional embedded applications including medical, security, and industrial uses. In a DLP projector, light is reflected by a mirror device and is projected to the display screen (a projection surface). The image is created by microscopically small mirrors laid out in a matrix on a semiconductor chip, known as a digital micro-mirror device (DMD). These mirrors are of a few micrometer. Each mirror represents one or more pixel in a projected image. These mirrors can be individually rotated rapidly to reflect light either through the lens or to a heat sink. Rapidly toggling the mirror between these two orientations (essentially by switching on and off of the device) produces gray-scales, which are controlled by the ratio of on-time to off-time.

The DLP system includes a light source, a DMD device, optical components to integrate, align and project light beam, a DLP controller, a light source driver and heat sink.

FIG. 1 shows a schematic diagram of a DLP projector. As shown in FIG. 1, the DLP projector includes a light source unit 101, a DMD device 102, a reflector 103 and a projection lens unit 104. The light source unit 101 may include red, blue and green light sources. The light produced by the light source 101 is reflected by the reflector 103 to the DMD device 102. The DMD device 102 modulates the input light into a projection image. The projection image goes through the reflector 103 and is projected on the projection surface 105 on which a display image is formed.

FIG. 2 shows a schematic diagram of a DMD device 202. As shown in FIG. 2, multiple micro-mirrors 203 are formed on the DMD device 202. They are micro-electro-mechanical devices and can be rotated under a control signal.

There is a demand in the art that a new solution for a projector shall be proposed to address at least one of the problems in the prior art.

SUMMARY OF THE INVENTION

One object of this invention is to provide a new technical solution for a projector.

According to a first aspect of the present invention, there is provided a projection module, comprising: a projection chip having micro semiconductor light emitting devices thereon; and a projection lens unit, wherein the micro semiconductor light emitting devices produce projection light to create a projection image, and the projection lens unit receives the projection image and projects it to a projection surface.

Alternatively or optionally, the micro semiconductor light emitting devices are at least one of micro light emitting diodes and micro laser diodes.

Alternatively or optionally, the micro semiconductor light emitting devices include red, green and blue micro semiconductor light emitting devices.

Alternatively or optionally, the projection chip is movable to form the projection image in a line scan manner.

Alternatively or optionally, the micro semiconductor light emitting devices of the projection chip are movable to form the projection image in a line scan manner.

Alternatively or optionally, the projection lens unit is integrated with the projection chip and includes multiple micro projection lens sub-units, and each micro projection lens sub-unit is formed on the top of one micro semiconductor light emitting device.

Alternatively or optionally, the micro semiconductor light emitting devices include a first array of red micro semiconductor light emitting devices which forms a red projection sub-image, a second array of green micro semiconductor light emitting devices which forms a green projection sub-image, a third array of blue micro semiconductor light emitting devices which forms a blue projection sub-image, and the projection lens unit combines the red, green and blue projection sub-images into one image.

Alternatively or optionally, the micro semiconductor light emitting devices include a first array of red micro semiconductor light emitting devices which forms a red projection sub-image, a second array of green micro semiconductor light emitting devices which forms a green projection sub-image, a third array of blue micro semiconductor light emitting devices which forms a blue projection sub-image, and the first, second and third arrays are movable to emit the red, green and blue projection sub-images to the projection lens unit in sequence to form one image.

According to a second aspect of the present invention, there is provided an electronics apparatus comprising a projection module according to the present invention, wherein the electronics apparatus is one of a smart phone and a wearable device.

Alternatively or optionally, the electronics apparatus further comprises a camera to capture an action on the projection image projected by the projection module, and the electronics apparatus processes the action captured by the camera for interactive application and uses it as a control signal for the electronics apparatus.

According to an embodiment of this invention, the size of a projection module can be reduced.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
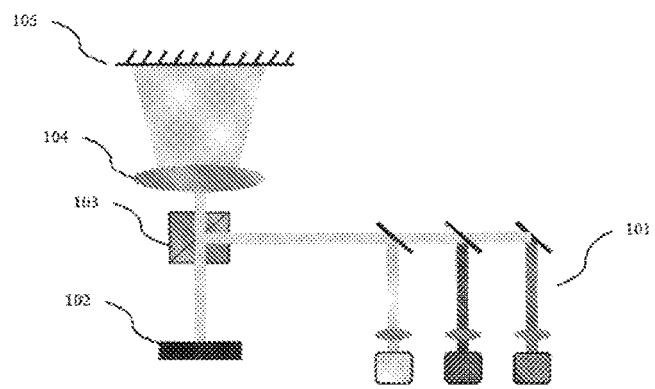
FIG. 1 is a schematic diagram of a prior art DLP projector.
Figure 2:
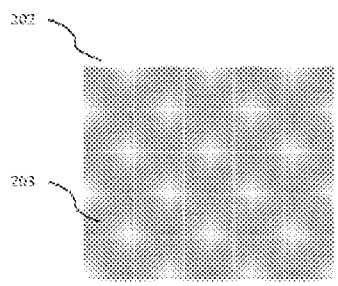
FIG. 2 is a schematic diagram of a DMD device.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Embodiments and examples will be described with reference to the drawings below.

Figure 3:
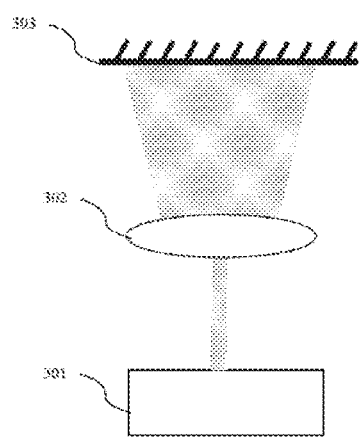
FIG. 3 is a schematic diagram of a projection module according to an embodiment of the present invention.

FIG. 3 shows a schematic diagram of a projection module according to an embodiment of the present invention.

As shown in FIG. 3, the projection module comprises a projection chip 301 and a projection lens unit 302.

The projection chip 301 has micro semiconductor light emitting devices thereon. The micro semiconductor light emitting devices produce projection light to create a projection image. For example, the micro semiconductor light emitting devices can be at least one of micro light emitting diodes and micro laser diodes. The projection chip 301 may be formed on a single substrate or include several substrates.

The projection lens unit 302 receives the projection image from the projection chip and projects it to a projection surface 303. A display image will be formed on the projection surface 303.

Figure 4:
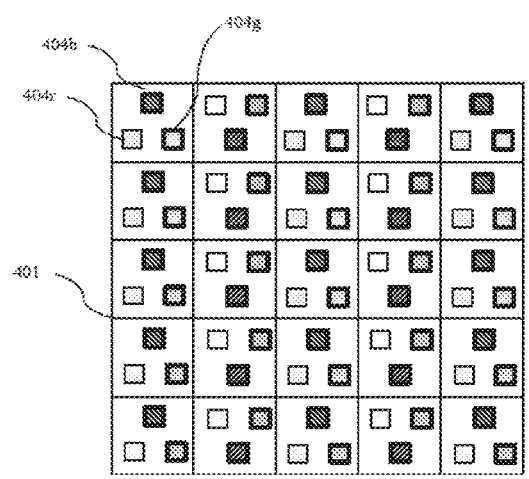
FIG. 4 is a schematic diagram of an arrangement of micro semiconductor light emitting devices in a projection chip according to an embodiment of the present invention.

FIG. 4 shows a schematic diagram of an arrangement of micro semiconductor light emitting devices in a projection chip according to an embodiment of the present invention.

As shown in FIG. 4, the projection chip 401 comprises multiple micro semiconductor light emitting devices, which include red micro semiconductor light emitting devices 404r, green micro semiconductor light emitting devices 404g and blue micro semiconductor light emitting devices 404b.

For example, as shown in FIG. 4, these micro semiconductor light emitting devices can be grouped into multiple pixels, each of which includes a red micro semiconductor light emitting device 404r, a green micro semiconductor light emitting device 404g and a blue micro semiconductor light emitting device 404b.

For example, these micro semiconductor light emitting devices are micro light emitting diodes (micro-LEDs). These micro-LEDs are fabricated on AM-TFT (Active Matrix Thin Film Transistor) backplane or PM-TFT (Passive Matrix Thin Film Transistor) backplane. The backplane can be manufactured by a semiconductor substrate or a glass substrate.

Figure 5:
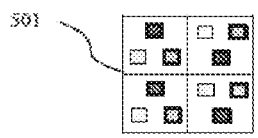
FIG. 5 is a schematic diagram of an arrangement of micro semiconductor light emitting devices in a projection chip according to another embodiment of the present invention.

FIG. 5 shows a schematic diagram of an arrangement of micro semiconductor light emitting devices in a projection chip according to another embodiment of the present invention.

As shown in FIG. 5, the projection chip 501 can just contain a few pixels, such as one or more pixels. In this embodiment, the projection module can form a projection image in a line scan manner. That is, the pixels of the micro semiconductor light emitting devices are less than those of the projection image, and the projection image is formed by rotating the micro semiconductor light emitting devices 2-dimensionally to project light beam in a line scan manner, and to scan the image in a short time.

For example, the projection chip 501 can be rotated in 2-dimension to form the projection image in a line scan manner. In this regard, a micro actuator (not shown) may be used to rotate the projection chip 501.

In another example, the micro semiconductor light emitting devices of the projection chip 501 can be rotatable to form the projection image in a line scan manner. Here, the micro semiconductor light emitting devices can be a micro-electro-mechanical system and can be actuated under a control signal to scan the image.

By using the line scan manner, the size of the projection module may be reduced and the quantity of the micro semiconductor light emitting devices may be lowered.

Figure 6:
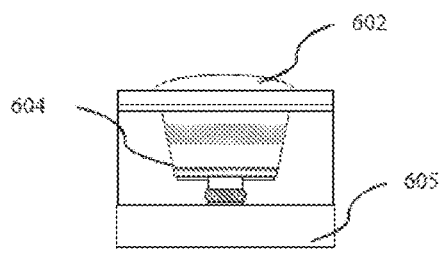
FIG. 6 is a schematic diagram of a micro semiconductor light emitting device with a micro projection lens sub-unit according to another embodiment of the present invention.

FIG. 6 is a schematic diagram of a micro semiconductor light emitting device with a micro projection lens sub-unit according to another embodiment of the present invention.

In this embodiment, the projection lens unit can be integrated with the projection chip. The projection lens unit includes multiple micro projection lens sub-units 602. As shown in FIG. 6, each micro projection lens sub-unit 602 is formed on the top of one micro semiconductor light emitting device 604. The light emitting device 604 is formed on a backplane 605.

In this way, the integration degree of the projection module may be improved.

Optionally, the size of the projection module may be further lowered.

Optionally, it is advantageous to use the micro semiconductor light emitting device of FIG. 6 in the embodiment of FIG. 5, since the micro projection lens sub-unit 602 can be moved as the movement of the light emitting device 604.

In another embodiment of the present invention, the micro semiconductor light emitting devices of different colors are formed on different substrate.

Figure 7:
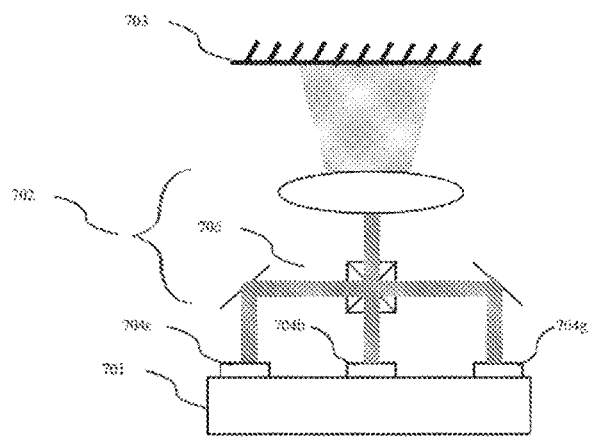
FIG. 7 is a schematic diagram of a projection module according to another embodiment of the present invention.

FIG. 7 shows a schematic diagram of a projection module according to another embodiment of the present invention.

As shown in FIG. 7, the projection chip 701 includes multiple micro semiconductor light emitting devices. The micro semiconductor light emitting devices include a first array 704*r* of red micro semiconductor light emitting devices which forms a red projection sub-image, a second array 704*g* of green micro semiconductor light emitting devices which forms a green projection sub-image, a third array 704*b* of blue micro semiconductor light emitting devices which forms a blue projection sub-image.

As shown in FIG. 7, the projection lens unit 702 can combine the red, green and blue projection sub-images into one image. For example, the projection lens unit 702 includes a reflection unit 706, which adjusts the light paths of the light from the first array 704*r*, the second array 704*g* and the third array 704*b* and combines them into one light beam. The reflection unit 706 directs the combined light beam to the lens for projection.

Figure 8:
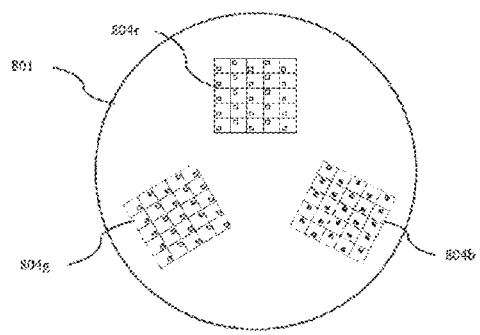
FIG. 8 is a schematic diagram of an arrangement of micro semiconductor light emitting device arrays in a projection chip according to another embodiment of the present invention.

FIG. 8 shows a schematic diagram of an arrangement of micro semiconductor light emitting device arrays in a projection chip according to another embodiment of the present invention.

As shown in FIG. 8, the projection chip 801 includes multiple micro semiconductor light emitting devices. The micro semiconductor light emitting devices include a first array 804*r* of red micro semiconductor light emitting devices which forms a red projection sub-image, a second array 804*g* of green micro semiconductor light emitting devices which forms a green projection sub-image, a third array 804*b* of blue micro semiconductor light emitting devices which forms a blue projection sub-image.

The first, second and third arrays 804*r*, 804*g*, 804*b* are movable to emit the red, green and blue projection sub-images to the projection lens unit (not shown) in sequence to form one image. For example, the projection chip 801 can rotate and thus the first, second and third arrays 804*r*, 804*g*, 804*b* can be placed at a predetermined projection position in sequence. The predetermined projection position may be a position for the projection lens unit to receive the projection image and projects it to the projection surface.

The arrangement of separate arrays of different color will benefit the manufacture of the micro semiconductor light emitting device arrays. For example, it will simplify the transfers of micro semiconductor light emitting device arrays of different colors from a grown substrate to a receiving substrate (backplane).

Alternatively, this arrangement will reduce the influence of a transfer onto its previous transfer. For example, generally, three transfers will be performed to transfer red, green and blue light emitting device arrays onto the backplane. If the transfer of a green device array is performed after the transfer of a red device array, it will harm the red devices which have already placed on the backplane. By the arrangement of separate arrays, this influence will be reduced.

Figure 9:
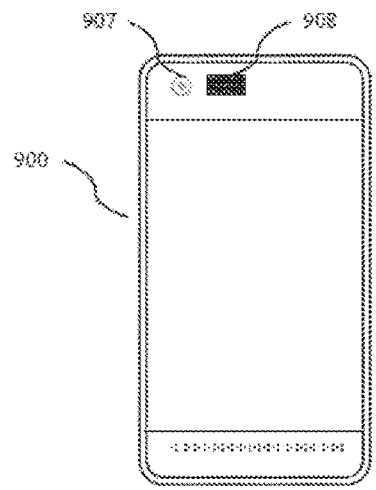
FIG. 9 is a schematic diagram of an electronics apparatus according to an embodiment of the present invention.

FIG. 9 is a schematic diagram of an electronics apparatus according to an embodiment of the present invention.

For example, FIG. 9 shows a back side of an electronics apparatus 900. As shown in FIG. 9, the electronics apparatus 900 comprises a projection module 908 according to any of the above embodiment. The electronics apparatus 900 may be one of a smart phone and a wearable device. The wearable device may be a smart watch or smart band.

In an example, the electronics apparatus 900 may further comprises a camera 907. The camera 907 may be used to capture an action on the projection image projected by the projection module 908. The camera 907 and the projection module 908 may constitute a virtue control device for the electronics apparatus 900. The electronics apparatus 900 may process the action captured by the camera 907 as a control signal.

In the prior art, a DLP projector utilizes digital mirror devices as reflectors to project light emission from a light source to a display screen. Normally, a pico DLP projection system is in size of several centimeters. So, it is actually difficult to embed a DLP system in a small electronics apparatus such as a smart phone or a wearable device including a smart watch or smart band.

Furthermore, in a DLP projector, the light from light source is reflected by mirrors on to a display screen, wherein unwanted light is reflected to a heat sink. The light reflected to the heat sink do not contribute to the projection but consumes energy. It produces energy waste.

Besides, a higher quality of projection image requires a higher power of light source and also a larger heat sink, which will hinder the decrease of the device size.

In addition, the response time of a DLP projection pixel is of a few microseconds, which is longer than that of other projection systems such as a Liquid Crystal on Silicon (LCoS) projection system. The relatively long response time will harm the quality of the projection image.

Alternatively or optionally, as compared to the prior art DLP projection module, a projection module according to an embodiment of the present invention uses a projection chip in place of the light source and the DMD device. As such, the space for light source, optical component to integrate and align R/G/B light beams in the DLP module can be saved. This reduces the size of the projection module.

Alternatively or optionally, the shrink of the projection module is important for embedding the projection module in a small apparatus such as a smart phone, a wearable device, etc.

Alternatively or optionally, as compared to the prior art DLP projection module, the response time of the pixel in the projection module according to an embodiment of the present invention can be decrease from several microseconds to several nanoseconds. This improves the quality of the projection image.

Alternatively or optionally, as compared to the prior art DLP projection module, the unwanted light for the projection image can be eliminated by switching off the micro semiconductor light emitting devices, instead of projecting it to a heat sink. This reduces the energy waste of a projection module.

Although some specific embodiments of the present invention have been demonstrated in detail with examples, it should be understood by a persons killed in the art that the above examples are only intended to be illustrative but not to limit the scope of the present invention.

What is claimed is:

1. A projection module, comprising:
   a projection chip, having micro semiconductor light emitting devices thereon; and
   a projection lens unit,
   wherein the micro semiconductor light emitting devices produce projection light to create a projection image, and the projection lens unit receives the projection image and projects it to a projection surface, and
   the projection lens unit is integrated with the projection chip and includes multiple micro projection lens sub-units, and each micro projection lens sub-unit is formed on the top of one micro semiconductor light emitting device.

2. The projection module according to claim 1, wherein the micro semiconductor light emitting devices are at least one of micro light emitting diodes and micro laser diodes.

3. The projection module according to claim 1, wherein the micro semiconductor light emitting devices include red, green and blue micro semiconductor light emitting devices.

4. The projection module according to claim 1, wherein the projection chip is movable to form the projection image in a line scan manner.

5. The projection module according to claim 1, wherein the micro semiconductor light emitting devices of the projection chip are movable to form the projection image in a line scan manner.

6. The projection module according to claim 1, wherein the micro semiconductor light emitting devices include a first array of red micro semiconductor light emitting devices which forms a red projection sub-image, a second array of green micro semiconductor light emitting devices which forms a green projection sub-image, a third array of blue micro semiconductor light emitting devices which forms a blue projection sub-image, and the projection lens unit combines the red, green and blue projection sub-images into one image.

7. The projection module according to claim 1, wherein the micro semiconductor light emitting devices include a first array of red micro semiconductor light emitting devices which forms a red projection sub-image, a second array of green micro semiconductor light emitting devices which forms a green projection sub-image, a third array of blue micro semiconductor light emitting devices which forms a blue projection sub-image, and the first, second and third arrays are movable to emit the red, green and blue projection sub-images to the projection lens unit in sequence to form one image.

8. An electronics apparatus comprising a projection module according to claim 1, wherein the electronics apparatus is one of a smart phone and a wearable device.

9. The electronics apparatus according to claim 8, further comprising a camera to capture an action on the projection image projected by the projection module, and the electronics apparatus processes the action captured by the camera for interactive application.

\* \* \* \* \*